United States Patent
Kumar et al.

(10) Patent No.: US 9,663,721 B2
(45) Date of Patent: May 30, 2017

(54) HEAT RECOVERY FROM A NAPHTHA FRACTIONATION COLUMN

(71) Applicant: UOP LLC, Des Plaines, IL (US)

(72) Inventors: Manoj Kumar, Haryana (IN); David James Shecterle, Arlington Heights, IL (US)

(73) Assignee: UOP LLC, Des Plaines, IL (US)

(*) Notice: Subject to any disclaimer, the term of this patent is extended or adjusted under 35 U.S.C. 154(b) by 421 days.

(21) Appl. No.: 14/477,362

(22) Filed: Sep. 4, 2014

(65) Prior Publication Data

US 2016/0068764 A1 Mar. 10, 2016

(51) Int. Cl.
| | |
|---|---|
| *C10G 7/12* | (2006.01) |
| *C10G 7/02* | (2006.01) |
| *C10G 53/02* | (2006.01) |
| *C10G 61/02* | (2006.01) |
| *C10G 35/24* | (2006.01) |

(52) U.S. Cl.
CPC ............... *C10G 7/12* (2013.01); *C10G 7/02* (2013.01); *C10G 35/24* (2013.01); *C10G 53/02* (2013.01); *C10G 61/02* (2013.01); *C10G 2300/104* (2013.01); *C10G 2300/1044* (2013.01); *C10G 2300/4006* (2013.01); *C10G 2300/4012* (2013.01); *Y02P 20/124* (2015.11)

(58) Field of Classification Search
CPC . C10G 7/02; C10G 7/12; C10G 35/24; C10G 45/58
See application file for complete search history.

(56) References Cited

U.S. PATENT DOCUMENTS

| | | | |
|---|---|---|---|
| 4,008,150 A * | 2/1977 | Gewartowski | C10G 7/02 208/352 |
| 4,897,098 A | 1/1990 | Pate et al. | |
| 5,233,120 A | 8/1993 | Minkkinen et al. | |
| 5,602,291 A | 2/1997 | Minkkinen et al. | |
| 6,573,417 B1 | 6/2003 | Rice | |
| 7,638,676 B2 | 12/2009 | Rice | |
| 2007/0007171 A1* | 1/2007 | Strack | C10G 9/002 208/48 Q |
| 2012/0279900 A1* | 11/2012 | Noureldin | C10G 45/04 208/89 |
| 2013/0192298 A1 | 8/2013 | Sadler et al. | |

OTHER PUBLICATIONS

Fernandez et al., "UOP's New Once—Through Hydrogen Penex Technology . . . " National Petroleum Refiners Association Annual Meeting (1988), Mar. 20-22, San Antonio, TX, pp. 1-24.
Galstaun et al., "Heat pumping pays out in C5/C6 isom plant," Oil & Gas Journal (1979), 77(46), 223-226.

* cited by examiner

Primary Examiner — Renee Robinson

(57) ABSTRACT

A process for separating naphtha feed stream and recovering heat from at least one stream from a column by heating other columns. Preferably, both an overhead stream and a bottom stream from a first column heat a second column and a third column. The pressure of the overhead stream is increased, resulting in an increased temperature of the overhead and bottoms streams. The overhead stream can be split into portions to heat other columns.

20 Claims, 1 Drawing Sheet

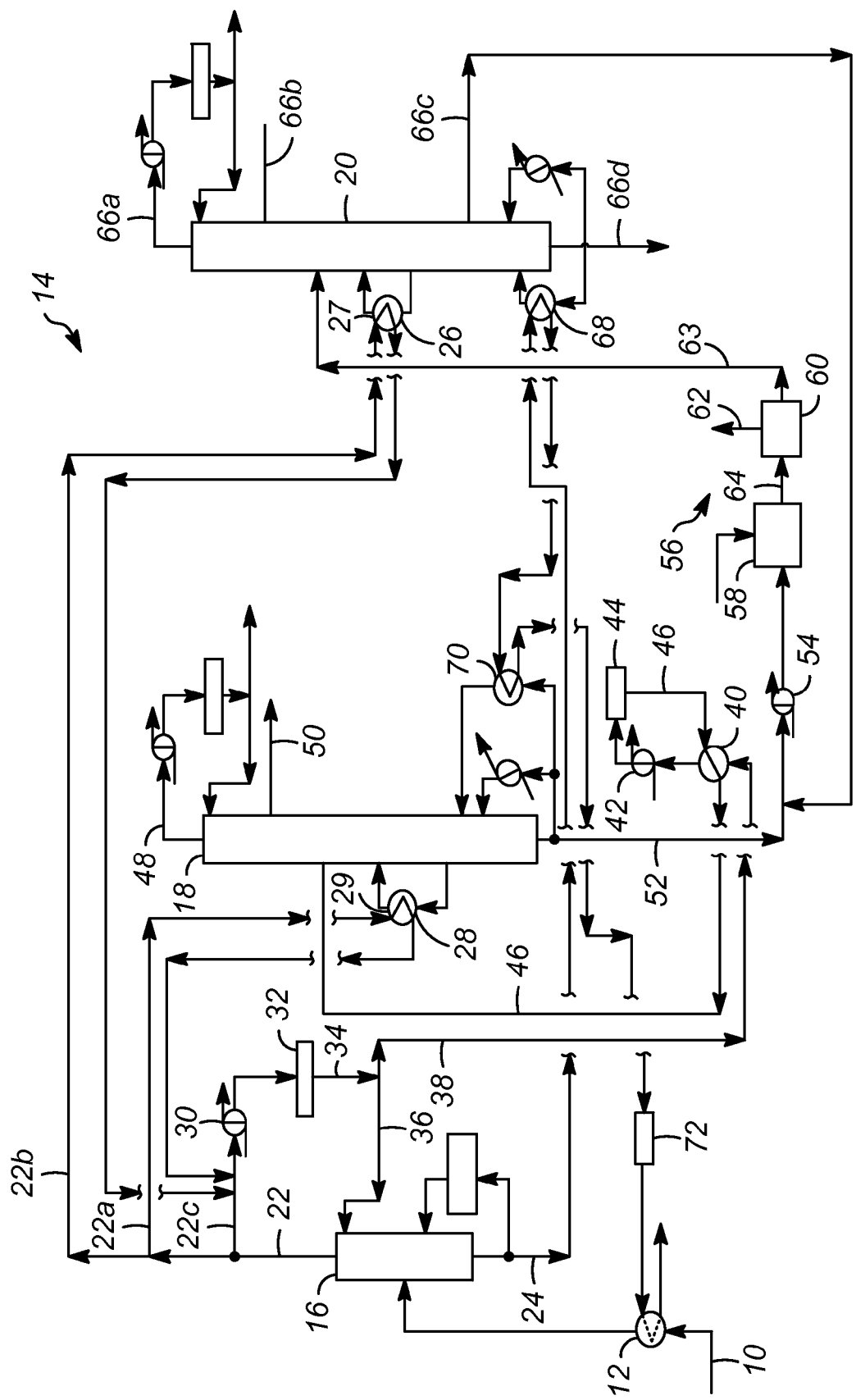

HEAT RECOVERY FROM A NAPHTHA FRACTIONATION COLUMN

FIELD OF THE INVENTION

This invention relates generally to processes for the separation of a naphtha stream, and more partially to heat recovery associated with separating and isomerization a naphtha stream.

BACKGROUND OF THE INVENTION

In general, a naphtha feedstock may contain from $C_5$ to about $C_{11}$ or $C_{12}$ hydrocarbons with a boiling point range from about 82° C. to about 240° C. Specific reforming zone feedstocks may be generated using separation techniques.

For example, a naphtha feedstock may be introduced into a separation zone comprising one or more fractional distillation columns to separate into a heavy naphtha fraction and a light naphtha fraction. The lower-boiling light naphtha fraction may contain $C_5$ and $C_6$, which can be isomerized, for example to produce an isomerate component suitable for blending into current reformulated gasoline. The heavy naphtha fraction may contain $C_7$ to $C_{11}$ or $C_{12}$ hydrocarbons. The hydrocarbon components of this naphtha fraction can be catalytically reformed, for example to produce a reformate component suitable for blending into current reformulated gasoline.

Typically, the separation requires energy in the form of heat. As a result of the costs associated with supplying the heat, as well as the need to keep operating costs and capital equipment costs down, refiners and processors are constantly seeking to improve on the overall processes and associated with separating and reforming or isomerizing naphtha feed stocks.

Therefore, there remains a need for an energy efficient and effective process for the separation and isomerization of a naphtha feed stock.

SUMMARY OF THE INVENTION

One or more processes for the separation and isomerization of a naphtha feed stock have been discovered.

In a first aspect embodiment of the invention, the invention may be characterized as a process for recovering heat from the separation of a naphtha stream in which the process includes: separating a naphtha stream in a naphtha separation column into an overhead stream comprising light naphtha and a bottoms stream comprising heavy naphtha; splitting the overhead stream of the naphtha separation column into at least a first stream and a second stream; recovering heat from the first stream of the overhead stream of the naphtha separation column in a first heat exchanger; heating a second column with the heat recovered from the first stream of the overhead stream of the naphtha separation column in the first heat exchanger; and, recovering heat from the second stream of the overhead stream of the naphtha separation column in a second heat exchanger.

In at least one embodiment, the process includes recovering heat from the bottoms stream of the naphtha separation column in a third heat exchanger. It is also contemplated that the process includes heating the second column with the heat recovered from the bottoms stream of the naphtha separation column in the third heat exchanger. It is further contemplated that the process includes recovering heat from the bottoms stream of the naphtha separation column in a fourth heat exchanger, and even further includes heating a third column with the heat recovered from the bottoms stream of the naphtha separation column in the fourth heat exchanger. It is also contemplated that the process includes heating the third column with the heat recovered in the second portion of the overhead stream of the naphtha separation column in the second heat exchanger.

In one or more embodiments, the process includes heating a third column with the heat recovered in the second stream of the overhead stream of the naphtha separation column in the second heat exchanger. It is contemplated that the process includes passing the overhead stream of the naphtha separation column to the second column, and separating the overhead stream of the naphtha separation column into at least a vapor stream and a bottom stream in the second column. The process may further include passing the bottoms stream of the second column to an isomerization reactor, isomerizing the bottoms stream of the second column, and, passing a portion of the reactor effluent from the isomerization reactor to the third column.

In a second aspect embodiment of the invention, the invention may be characterized as a process for recovering heat from the separation of a naphtha stream in which the process includes: separating a naphtha stream in a naphtha separation column into an overhead stream comprising light naphtha and a bottoms stream comprising heavy naphtha; splitting the overhead stream of the naphtha separation column into at least a first stream, a second stream, and a third stream; recovering heat from the first stream of the overhead stream from the naphtha separation column in a first heat exchanger; recovering heat from the second stream of the overhead stream from the naphtha separation column in a second heat exchanger; and, condensing at least a portion of the overhead stream from the naphtha separation column.

In at least one embodiment of the present invention, the process also includes heating a second column with the heat recovered from the first stream of the overhead stream from the naphtha separation column, and heating a third column with the heat recovered from the second stream of the overhead stream from the naphtha separation column in a second heat exchanger.

In some embodiments of the present invention, the process further includes combining the first stream of the overhead stream from the naphtha separation column and the second stream of the overhead stream from the naphtha separation column with the third stream of the overhead stream from the naphtha separation column to form a combined overhead stream. The streams are combined after heat is recovered from the first and second streams. The process further includes condensing the combined overhead stream into a liquid stream, passing the liquid stream cleaning zone to provide a cleaned stream, and, heating the liquid stream entering the cleaning zone with the heat recovered from the cleaned stream in a third heat exchanger.

It one or more embodiments, the process includes passing the cleaned stream to the second column as a feed stream. It is contemplated to further include separating the cleaned stream in the second column into at least an overhead stream and a bottom stream, and passing the bottoms stream to an isomerization zone. It is further contemplated to include isomerizing the bottoms stream of the second column in the isomerization zone, and, passing at least a portion of an effluent stream from the isomerization zone to the third column.

In some embodiments of the present invention, the second column is a depentanizer column. It is contemplated that the third column is a deisohexanizer column. It is even further contemplated that the first heat exchanger is a sidedraw reboiler for the depentanizer column and the second heat exchanger is a sidedraw reboiler for the deisohexanizer column.

In at least one embodiment of the present invention, the process includes heating at least one of the deisohexanizer column and the depentanizer column with the bottoms stream from the naphtha separation column. In some embodiments, the process includes heating the deisohexanizer column and the depentanizer column with the bottoms stream from the naphtha separation column.

In a third aspect embodiment of the invention, the invention may be characterized as a process for recovering heat from the separation of a naphtha stream in which the process includes: separating a naphtha stream in a naphtha separation column into an overhead stream comprising light naphtha and a bottoms stream comprising heavy naphtha; splitting the overhead stream of the naphtha separation column into at least a first stream, a second stream, and a third stream; heating a depentanizer column with the first stream of the overhead stream from the naphtha separation column; heating a deisohexanizer column with the second stream of the overhead stream from the naphtha separation column in a second heat exchanger; heating the deisohexanizer column and the depentanizer column with the bottoms stream from the naphtha separation column; and, passing the overhead stream of the naphtha separation column to the depentanizer column.

Additional objects, embodiments, and details of the invention are set forth in the following detailed description of the invention.

DETAILED DESCRIPTION OF THE DRAWINGS

The drawing is a simplified process diagram in which the FIGURE depicts a process according to one or more embodiments of the present invention.

DETAILED DESCRIPTION OF THE INVENTION

One or more processes for the separation and isomerization of a naphtha feed stock have been discovered in which the pressure of an overhead vapor of a naphtha separation column is increased compared to traditional methods. While increasing the pressure of the overhead vapor of the column initially requires additional expenditures in the added cost of increasing the temperature, energy and costs savings can be appreciated by effectively transferring heat in the overhead vapor to various other portions of the refinery complex. In other words, the initial increased energy input can be offset by savings associated with energy recovery elsewhere. Additionally, lower capital expenditures may be provided by a reduction in the size of the condenser, which is relatively expensive, associated with the naphtha separation column. Furthermore, due to the heat recovery associated with various streams, lower operating costs may also be provided.

Therefore with reference the FIGURE, one or more exemplary embodiments will be described with the understanding that the following is merely exemplary and not intended to be limiting.

As shown in the FIGURE, a feed stream 10 is passed, preferably through a heat exchanger 12, to a separation zone 14. The feed stream 10 preferably comprises a full naphtha stream, meaning the feed stream 10 comprises $C_{12}-$ hydrocarbons (hydrocarbons with 12 carbon atoms or less).

The separation zone 14 typically comprises one or more separation columns 16, 18, 20. In a most preferred embodiment, a first separation column 16 comprises a naphtha splitter column, a second separation column 18 comprises a depentanizer column, and a third separation column 20 comprises a deisohexanizer column. These columns and the typical operating conditions associated with same are known in the art.

In the first separation column 16, the feed stream 10 is separated into an overhead stream 22 comprising light naphtha ($C_6-$ hydrocarbons) and a bottoms stream 24 comprising heavy naphtha ($C_7+$ hydrocarbons). In known process, the typical operating conditions for the first separation column 16 comprise an operating pressure of 144.8 kPag (21 psig) so that the temperature of the bottoms stream 24 is approximately 140.5° C. (285° F.) and the temperature of the overhead stream 22 is approximately 80° C. (175° F.)

In these processes, the overhead stream 22 of the first separation column 16 is cooled before passing into a subsequent separation column, and the bottoms stream 24 heats the feed stream 10 in the heat exchanger 12. According to one or more embodiments of the present invention, however, while the bottoms stream 24 can still be used to heat the feed stream 10, the pressure of the overhead stream of the first separation column, is increased so that the temperature of the overhead stream 22 is sufficient to provide heat to at least two subsequent columns.

Accordingly, as shown in the FIGURE, the overhead stream 22 from the first separation column 16 is split into multiple portions, preferably at least three portions (or streams) 22a, 22b, 22c.

In order to recover heat from the overhead stream 22, a first portion 22a of the overhead stream 22 can pass to a first heat exchanger 28. In a preferred embodiment, the first heat exchanger 28 comprises a reboiler 29 for the second separation column 18. Additionally, in embodiments in which the second separation column 18 is a depentanizer column, the reboiler 29 is also preferably a sidedraw reboiler. Typical operating conditions for the second separation column 18 include a pressure of approximately 241 kpag (35 psig), an overhead temperature of approximately 68° C. (154° F.), a bottoms temperature of approximately 113° C. (236° F.) and a Sidedraw temperature (at a reboiler inlet) of approximately 100° C. (212° F.).

A second portion 22b of the overhead stream 22 can pass to a second heat exchanger 26. In a preferred embodiment, the second heat exchanger 26 comprises a reboiler 27 for the third separation column 20. In embodiments in which the third separation column 20 is a deisohexanizer column, the reboiler 27 is preferably a sidedraw reboiler.

Typical operating conditions for the third separation column 20 include a pressure of approximately 138 kpag (20 psig), an overhead temperature of approximately 77° C. (154° F.), a bottoms temperature of approximately 113° C. (236° F.) and a Sidedraw temperature (at a reboiler inlet) of approximately 100° C. (212° F.).

While other heat exchangers and columns could be used for the reboilers 27, 29, it is believed that sidedraw reboilers for the deisohexanizer and depentanizer columns will allow for an efficient heat transfer without requiring a very large increase in pressure for the overhead stream 22 of the first separation column 16. Furthermore, by keeping the pressure increase of the overhead stream 22 of the first separation column 16 low, the reboiler duty associated with the first separation column 16 may also be lower in comparison to requiring a large pressure increase.

A third portion 22c of the overhead stream 22 from the first separation column 16 may be passed to a condenser 30 and then to a receiver 32. The third portion 22c is utilized for controllability of the heat recovery so that approximately 20% of the duty of the condenser needed without heat recovery from the overhead stream is required. Eventually, the first portion 22a and the second portion 22b of the overhead stream 22 will be combined with the third portion 22c to form a combined stream. While this is depicted as occurring upstream of the condenser 30, other configurations are contemplated.

A liquid stream 34 from the receiver 32 may be split into a reflux stream 36, which is passed back to the first separation column 16, and a light naphtha feed stream 38 (or a combined stream). In order to pass the light naphtha feed stream 38 to downstream processing, the light naphtha feed stream 38 is passed through a heat exchanger 40 and a heater 42 and then to a cleaning zone comprising, for example, a sulfur guard bed 44.

In the sulfur guard bed 44, sulfur compounds are removed, as is known, and a cleaned stream 46 is passed out of the sulfur guard bed 44. The cleaned stream 46 is used in heat exchanger 40 to heat the light naphtha feed stream 38 passing into the sulfur guard bed 44.

Subsequently, the cleaned stream 46 may be passed to the second separation column 18. In a preferred embodiment, the second separation column 18 separates the cleaned stream 46 into an overhead stream 48, a sidedraw stream 50, and a bottoms stream 52. The processing of the overhead stream 48 and sidedraw stream 50 of the second separation column 18 are known in the art and are not necessary to the practicing of the present invention. The bottoms stream 52 from the second separation column 18 can be passed to a cooler 54 and then to a downstream processing zone, such as an isomerization zone 56.

The isomerization zone 56 comprises, for example, one or more isomerization reactors 58 and at least one stabilization column 60. In the isomerization reactor 58, in the presence of a catalyst, normal paraffins in the bottoms stream may be converted into iso-paraffins, or iso-paraffins may be converted into normal paraffins. The isomerization reactors 58 are known in the art, the particulars of which are not important for the practicing of the present invention. In the stabilization column 60 of the isomerization zone 56, an overhead stream 62 comprising light ends is separated from a reactor effluent stream 64. At least a portion 63 of the reactor effluent stream 64 may then be passed from the isomerization zone 56 to the third separation column 20 of the separation zone 14.

In the third separation column 20, the portion 63 of the effluent stream 64 from the isomerization zone 56 is separated into one or more streams. For example, if the third separation column 20 is a deisohexanizer column, a light isomerate stream 66a, a heavy isomerate stream 66b, a sidedraw stream 66c, and a bottoms stream 66d may be produced. At least one stream may be passed back to the isomerization zone 56 to once again undergo isomerization. For example, sidedraw stream 66c, may be combined with the bottoms stream 52 from the second separation column 18. The further processing of the streams 66a, 66b, 66d produced by the third separation column 20 are known.

Based upon the above, the overhead stream 22 from the first separation column 16 provides heat to downstream separation columns 18, 20, lowering the amount of heat required to separate the hydrocarbons in those columns 18, 20. In addition to recovering heat from the overhead stream 22 of the first separation column 16, due to the increased temperature, it is contemplated to also recover heat from the bottoms stream 24 of the first separation column 16.

Accordingly, as shown in the FIGURE, the bottoms stream 24 of the first separation column 16 may be passed to a heat exchanger (or reboiler) 68 for the third separation column 20 and then to a heat exchanger (or reboiler) 70 for the second separation column 18. Other flow schemes are contemplated, for example, with the bottoms stream being passed first to the second column 18, or only being passed to one column, or being passed to more columns. The use of the bottoms stream 24 to heat downstream separation columns 18, 20, will also lower the amount of heat required to separate the hydrocarbons in those columns 18, 20.

After heating one or more columns 18, 20, the bottoms stream 24 passes through a sulfur guard bed 72. Since the bottoms stream 24 has an increased temperature compared to prior art designs, the bottoms stream 24 does not require the use of a heater prior to passing to the sulfur guard bed 72. After the sulfur guard bed 72, the bottoms stream 24 may pass to the heat exchanger 12 for the feed stream 10, and then be passed to downstream processing, for example, as a feed to a platforming complex.

Thus, in some embodiments, both the bottoms stream 24 and the overhead stream 22 can be used to provide heat to downstream separation columns, lowering the overall heat needed to effectively operate those columns. As will be appreciated by lowering the heat required, operating costs will be lower. Thus, even though the amount of heat used in the first column is higher, the net energy savings is believed to be lower.

In order to demonstrate the principles of one or more embodiments of the present invention, a theoretical model was done according to a preferred embodiment of the present invention. The various variables associated with the preferred embodiment and a prior art process are shown below in the various TABLES. More specifically, various operating parameters of the model as well as a prior art design are shown in TABLE 1.

TABLE 1

|  | Prior Art | Present Invention |
| --- | --- | --- |
| First Column Overhead Pressure | 145 kpag | 690 kpag |
| First Column Overhead Temp. | 78° C. | 127° C. |
| First Column Receiver Temp. | 57° C. | 114° C. |
| First Column Bottoms Temp. | 140° C. | 193° C. |

In TABLE 2, below, the duties associated with various reboilers and other equipment are shown.

TABLE 2

|  | Prior Art | Present Invention |
| --- | --- | --- |
| First Column Reboiler Duty | 72.1 mw | 101.1 mw |
| First Column Condenser Duty | 70 mw | 12.9 mw |
| Bottoms Stream Sulfur Guard Bed heater duty | 2.3 mw | 0 |
| Second Column Reboiler Sidedraw Duty | 0 | 31.4 mw |
| Second Column Reboiler (1$^{St}$ Column) Bottoms duty | 0 | 4.4 mw |
| Second Column Reboiler (Steam) Duty | 61.3 mw | 21.4 mw |
| Second Column Total Reboiling Duty | 61.3 mw | 57.2 mw |
| Second Column Condenser Duty | 64.4 mw | 64.8 mw |
| Second Column Bottoms Stream Sulfur Guard Bed Heater Duty | 5.9 mw | 3.5 mw |
| Third Column Reboiler (Sidedraw) Duty | 0 | 31.4 mw |

TABLE 2-continued

|  | Prior Art | Present Invention |
|---|---|---|
| Third Column Reboiler (1$^{St}$ Column) Duty | 0 | 10.6 mw |
| Third Column Reboiler (Steam) Duty | 58.9 mw | 18.8 mw |
| Third Column Total Reboiling Duty | 58.9 mw | 60.7 mw |
| Third Column Condenser Duty | 68.6 mw | 70.3 mw |
| Feed Cooler Duty | 7.3 mw | 10.3 mw |

The various energy savings from the theoretical modeling is shown below in TABLE 3.

TABLE 3

|  | Present Invention |
|---|---|
| Savings in steam heated reboiling duty | 80 mw |
| Savings in SGB heater duty | 4.7 mw |
| Total Savings in steam heater duty | 84.7 mw |
| Total Savings in steam heater duty | 66% |
| Increase in first column reboiler duty | 29 mw |
| Net Savings of Duty | 55.7 mw |
| Net Savings of Duty | 43% |
| Increase in feed air cooler duty | 2.9 mw |
| Savings in column condenser duties | 54.8 mw |
| Net air condenser duty savings | 51.9 mw |
| Air condenser duty savings | 25% |

As shown in TABLE 3, above, the net duty savings is approximately 55.7 mw or 43% of steam required in prior art for steam heated exchangers listed above. Additionally, the savings in the duty required for the cooler is 51.9 mw or 25% of air cooler duty required in prior art for air coolers listed above.

The total saving in steam heater duty of 66% was determined by dividing the 84.7 mw of savings by the sum of the prior art second column total reboiling duty and third column total reboiling duty and prior art sulfur guard bed heater duties for second and third columns.

Additionally, the net duty savings of 43% was determined by subtracting the increase in first column reboiler duty from the total saving in steam heater duty and by dividing the resulting FIGURE by the sum of the prior art second column total reboiling duty and prior art third column total reboiling duty and prior art sulfur guard bed heater duties for second and third columns.

Accordingly, the various processes of the present invention provide an energy savings even though the pressure/temperature of the first column is being increased. Thus, in addition to providing lower capital expenditures, the processes according to the present invention will provide lower operating costs as well.

It should be appreciated and understood by those of ordinary skill in the art that various other components such as valves, pumps, filters, coolers, etc. were not shown in the drawings as it is believed that the specifics of same are well within the knowledge of those of ordinary skill in the art and a description of same is not necessary for practicing or understating the embodiments of the present invention.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A process for recovering heat from the separation of a naphtha stream, the process comprising:
    separating a naphtha stream in a naphtha separation column into an overhead stream comprising light naphtha and a bottoms stream comprising heavy naphtha;
    splitting the overhead stream of the naphtha separation column into at least a first stream and a second stream;
    recovering heat from the first stream of the overhead stream of the naphtha separation column in a first heat exchanger;
    heating a second column with the heat recovered from the first stream of the overhead stream of the naphtha separation column in the first heat exchanger; and,
    recovering heat from the second stream of the overhead stream of the naphtha separation column in a second heat exchanger.

2. The process of claim 1 further comprising:
    recovering heat from the bottoms stream of the naphtha separation column in a third heat exchanger.

3. The process of claim 2 further comprising:
    heating the second column with the heat recovered from the bottoms stream of the naphtha separation column in the third heat exchanger.

4. The process of claim 3 further comprising:
    recovering heat from the bottoms stream of the naphtha separation column in a fourth heat exchanger.

5. The process of claim 4 further comprising:
    heating a third column with the heat recovered from the bottoms stream of the naphtha separation column in the fourth heat exchanger.

6. The process of claim 5 further comprising:
    heating the third column with the heat recovered in the second stream of the naphtha separation column in the second heat exchanger.

7. The process of claim 1 further comprising:
    heating a third column with the heat recovered in the second stream of the overhead stream of the naphtha separation column in the second heat exchanger.

8. The process of claim 7 further comprising:
    combining the first stream and the second stream to form a combined stream, after recovering heat from the first stream and the second stream;
    passing the combined stream to the second column; and,
    separating the combined stream into at least a vapor stream and a bottom stream in the second column.

9. The process of claim 8 further comprising:
    passing the bottoms stream of the second column to an isomerization reactor;
    isomerizing the bottoms stream of the second column; and,
    passing a portion of the reactor effluent from the isomerization reactor to the third column.

10. A process for recovering heat from the separation of a naphtha stream, the process comprising:
    separating a naphtha stream in a naphtha separation column into an overhead stream comprising light naphtha and a bottoms stream comprising heavy naphtha;
    splitting the overhead stream of the naphtha separation column into at least a first stream, a second stream, and a third stream;

recovering heat from the first stream of the overhead stream from the naphtha separation column in a first heat exchanger;
recovering heat from the second stream of the overhead stream from the naphtha separation column in a second heat exchanger; and,
condensing the third stream of the overhead stream from the naphtha separation column.

11. The process of claim 10 further comprising:
heating a second column with the heat recovered from the first stream of the overhead stream from the naphtha separation column; and,
heating a third column with the heat recovered from the second stream of the overhead stream from the naphtha separation column in a second heat exchanger.

12. The process of claim 11, wherein the second column is a depentanizer column and the third column is a deisohexanizer column.

13. The process of claim 12 wherein the first heat exchanger is a sidedraw reboiler for the depentanizer column and the second heat exchanger is a sidedraw reboiler for the deisohexanizer column.

14. The process of claim 13 further comprising:
heating at least one of the deisohexanizer column and the depentanizer column with the bottoms stream from the naphtha separation column.

15. The process of claim 13 further comprising:
heating the deisohexanizer column and the depentanizer column with the bottoms stream from the naphtha separation column.

16. The process of claim 10 further comprising:
combining the first stream of the overhead stream from the naphtha separation column and the second stream of the overhead stream from the naphtha separation column with the third stream of the overhead stream from the naphtha separation column to form a combined overhead stream after recovering heat from the first stream and after recovering heat from the second stream;
condensing the combined overhead stream into a liquid stream;
passing at least a portion of the liquid stream to a cleaning zone to provide a cleaned stream; and,
recovering heat from the cleaned stream in a third heat exchanger and then heating the liquid stream entering the cleaning zone with the heat recovered from the cleaned stream.

17. The process of claim 16 further comprising:
passing the cleaned stream to a second column as a feed stream.

18. The process of claim 17 further comprising:
separating the cleaned stream in the second column into at least an overhead stream and a bottom stream; and,
passing the bottoms stream to an isomerization zone.

19. The process of claim 18 further comprising:
isomerizing the bottoms stream of the second column in the isomerization zone; and,
passing at least a portion of an effluent stream from the isomerization zone to a third column.

20. A process for recovering heat from the separation of a naphtha stream, the process comprising:
separating a naphtha stream in a naphtha separation column into an overhead stream comprising light naphtha and a bottoms stream comprising heavy naphtha;
splitting the overhead stream of the naphtha separation column into at least a first stream, a second stream, and a third stream;
heating a depentanizer column with the first stream of the overhead stream from the naphtha separation column;
heating a deisohexanizer column with the second stream of the overhead stream from the naphtha separation column in a second heat exchanger; and
heating the deisohexanizer column and the depentanizer column with the bottoms stream from the naphtha separation column.

* * * * *